UNITED STATES PATENT OFFICE.

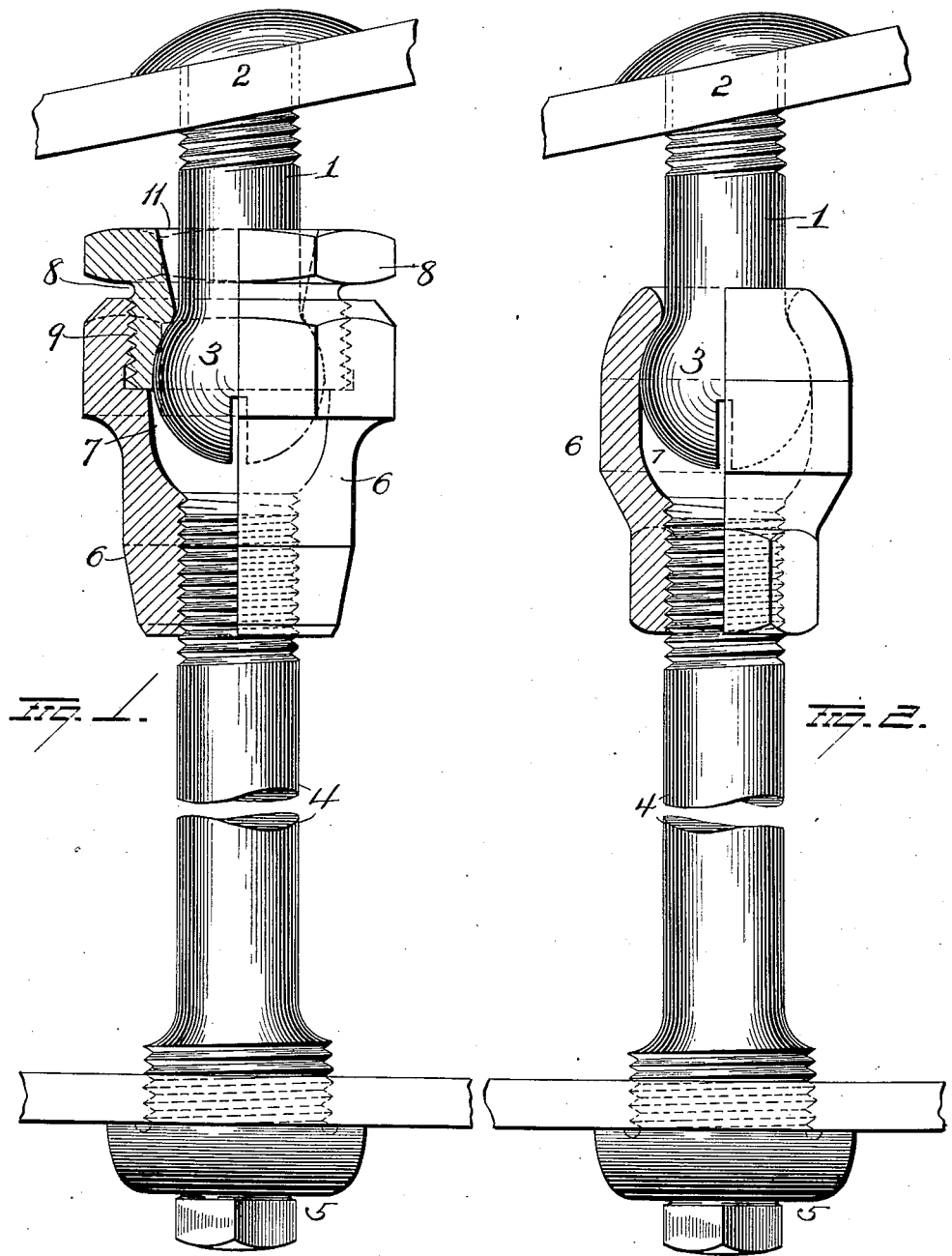

BENJAMIN E. D. STAFFORD, OF PITTSBURG, PENNSYLVANIA, ASSIGNOR TO FLANNERY BOLT COMPANY, OF PITTSBURG, PENNSYLVANIA.

FLEXIBLE STAY-BOLT FOR BOILERS.

999,898.

Specification of Letters Patent.

Patented Aug. 8, 1911.

Application filed March 18, 1909. Serial No. 484,248.

*To all whom it may concern:*

Be it known that I, BENJAMIN E. D. STAFFORD, of Pittsburg, in the county of Allegheny and State of Pennsylvania, have invented certain new and useful Improvements in Flexible Stay-Bolts for Boilers; and I do hereby declare the following to be a full, clear, and exact description of the invention, such as will enable others skilled in the art to which it appertains to make and use the same.

My invention relates to an improvement in flexible stay bolts for boilers, and it consists in the parts and combination of parts and in the details of construction as will be more fully described and pointed out in the claim.

In the accompanying drawing, Figure 1 is an enlarged view partly in section of an assembled stay bolt, and Fig. 2 is a view of a modified form of bolt.

1 represents a bolt of the type shown in the Tate Patent No. 753,329, having a partly spherical head and a screw threaded end. In the Tate patent the head of the bolt is seated in a bushing having a threaded connection with the roof or outer sheet of the boiler, the opposite end of the bolt being screwed to the crown or inner sheet and secured against displacement by upsetting the end of the screw. In the present instance the bolt is shortened and it is secured by threads to the outer sheet 2 of the boiler, with its spherical head 3 resting between the inner and outer sheets.

4 is a bolt screwed to the inner sheet in line with the bolt 1. This bolt is provided at its outer end with an ordinary button head stay 5, and at its inner end with screw threads onto which the sleeve 6 is screwed. The two bolts rest in, or approximately in the same plane, with their adjacent ends somewhat separated, and the sleeve 6 is provided with a restricted neck having a threaded bore to receive the threaded end of the bolt 4, and with a socket 7 for the reception of the head 3 of the bolt 1. The head 3 of bolt 1 is somewhat smaller than the socket 7 in sleeve 6, and it is retained in the latter by the bushing 8 having threads to engage the internal threads 9 at the open end of the sleeve. This bushing 8 is applied to bolt 1 before the latter is secured to the outer sheet, and it is provided with a rounded or curved seat 10 against which the head of bolt 1 bears and with a flaring opening 11 through which bolt 1 passes the said flaring opening permitting of the necessary movements while assembling the parts and permitting lateral movement of the connected bolts when the parts are under pressure.

The sleeve 6 and bushing 8, form a coupling which connects the bolts. This coupling is flexible and permits of the necessary movements of the bolts and the sheets in expanding and contracting, and it also permits of the ready assembling of the parts even if the two bolts are not exactly in line.

It is somewhat difficult to cut the threads in the outer and inner sheets, so that the bolts will rest in exactly the same plane or have the same axis, but with this improvement, it matters not whether the two bolts are in line, as a rigid coupling can be effected by means of the spherical head on one bolt and the sleeve and bushing connecting the head with the other bolt. Again it has been found in actual practice, that in some situations it is desirable to provide for expansion or elongation of the stay bolt. It is not always possible when assembling the parts to so adjust the couplings on the two bolts as to provide for the exact amount of expansion or elongation necessary, but with this improvement, by simply turning the sleeve so as to move the bushing 8 toward or away from the head, the necessary adjustment can be secured after the parts have been assembled.

The construction shown in Fig. 2 is the same as that described above, except that the end of the coupling or sleeve is closed down around the head of the bolt by suitable dies, thus permanently securing the sleeve to the spherical head.

It is evident that many slight changes might be resorted to in the relative arrangement of parts shown and described without departing from the spirit and scope of my invention. Hence I would have it understood that I do not wish to confine myself to the exact construction and arrangement of parts shown, but—

Having fully described my invention what I claim as new and desire to secure by Letters Patent, is:—

A flexible stay bolt composed of two members one having a rounded head at its inner end and the other screw threaded at its inner end, and a coupling embracing said rounded head, and having a curved bearing for the portion of the head adjacent to the body or stem of the bolt, and also having a curved seat or bearing for the rounded free end of said head, the said coupling also provided with a female threaded portion to directly engage the threaded end of the other member of the stay bolt.

In testimony whereof, I have signed this specification in the presence of two subscribing witnesses.

BENJAMIN E. D. STAFFORD.

Witnesses:
 EDWIN S. RYCE,
 HOWARD O. CAPPEL.